(12) United States Patent
Rajabali

(10) Patent No.: US 7,223,318 B2
(45) Date of Patent: May 29, 2007

(54) METHOD FOR FORMING A LAMINATE WITH A REBATE

(75) Inventor: Abdoel Faziel Rajabali, Alphen Aan de Rijn (NL)

(73) Assignee: Stork Fokker AESP B.V. (NL)

( * ) Notice: Subject to any disclaimer, the term of this patent is extended or adjusted under 35 U.S.C. 154(b) by 97 days.

(21) Appl. No.: 10/912,356

(22) Filed: Aug. 5, 2004

(65) Prior Publication Data
US 2005/0037225 A1    Feb. 17, 2005

(30) Foreign Application Priority Data
Aug. 8, 2003    (NL) .................................. 1024076

(51) Int. Cl.
*B32B 37/26* (2006.01)

(52) U.S. Cl. .................... 156/323; 156/288; 156/304.6

(58) Field of Classification Search ...................... None
See application file for complete search history.

(56) References Cited

U.S. PATENT DOCUMENTS

| | | | |
|---|---|---|---|
| 5,160,771 A | | 11/1992 | Lambing |
| 5,429,326 A | * | 7/1995 | Garesche et al. ............ 244/133 |
| 5,499,444 A | * | 3/1996 | Doane et al. ................. 29/830 |
| 5,866,272 A | * | 2/1999 | Westre et al. ............... 428/593 |
| 5,951,800 A | * | 9/1999 | Pettit ........................... 156/157 |
| 6,090,237 A | | 7/2000 | Reynolds |
| 6,288,343 B1 | * | 9/2001 | Ahn et al. .................... 174/254 |

FOREIGN PATENT DOCUMENTS

WO    WO9853989    12/1998

* cited by examiner

*Primary Examiner*—Jessica Ward
(74) *Attorney, Agent, or Firm*—Cooper & Dunham LLP

(57) ABSTRACT

A method for the production of a laminate consisting of metal layers as well as at least one fibre-reinforced bonding layer (5–7) that is located between the metal layers (1–4), which laminate has at least one region (9) that has a smaller number (3, 4, 7) of layers than the reminder of the laminate, comprises the following steps:

forming a stack (8) consisting of metal layers (1–4) and at least one fibre layer (5–7) impregnated with a binder, which stack (8) has a first series (11) of successive layers (1, 2, 5, 6) with a different surface size to a second series (12) of successive layers (3, 4, 7), such that one (12) of the series of layers protrudes with respect to the other series (11) of layers, placing an auxiliary tool (14) at the protruding portion (19) of the protruding series (12) of layers alongside the other series (11) of layers, which auxiliary tool (14) has a make-up that is the same as that of said other series (11) of layers, activating the fibre-reinforced bonding layers (5, 6, 7) under elevated pressure and temperature with the formation of the laminate.

10 Claims, 2 Drawing Sheets

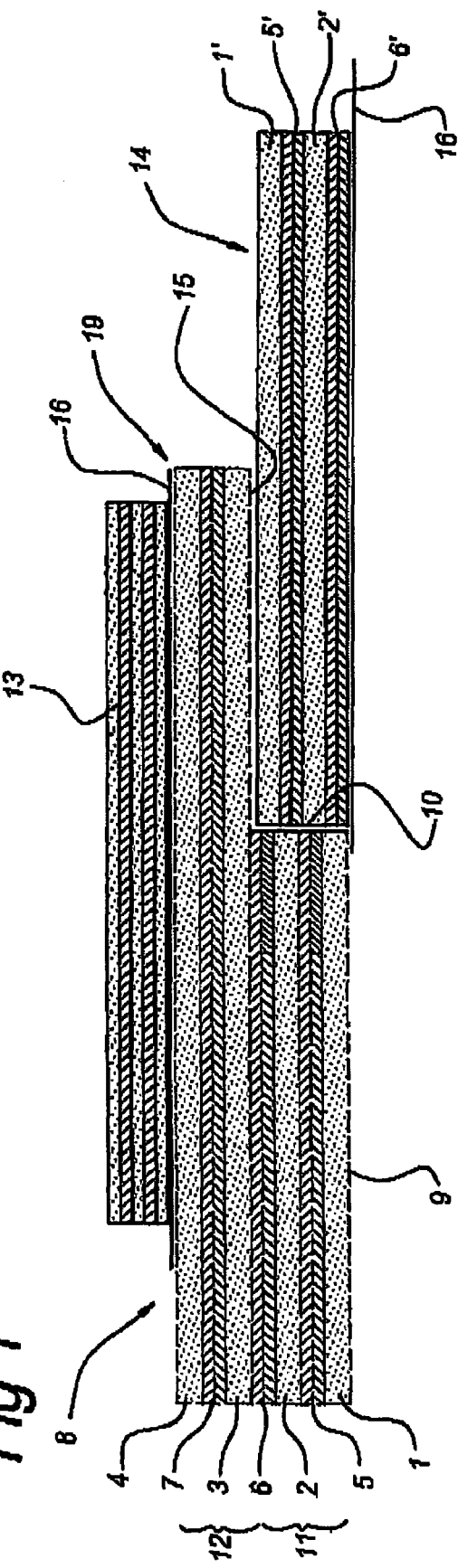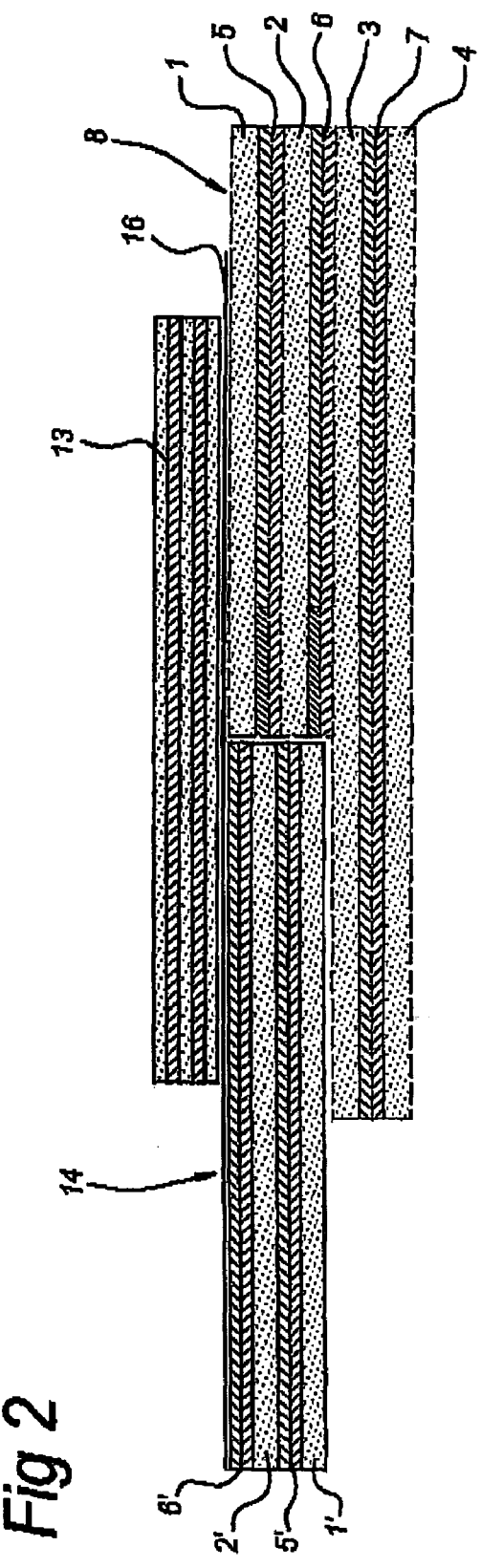

METHOD FOR FORMING A LAMINATE WITH A REBATE

BACKGROUND OF THE INVENTION

The invention relates to the production of laminates consisting of successive layers of metal and fibre-reinforced bonding layers. Such laminates are used in a wide variety of fields, such as in aviation and aerospace, in transport means, such as containers, and the like. For some applications the panels produced from such laminates are joined to one another by step-shaped edges. In this case each of the panels has an edge with a smaller number of layers than the remainder of the panel. The panels are joined to one another in such a way that the recessed steps fit into one another, as a result of which a smooth transition is obtained. Such a joint is advantageous especially in aviation, in the light of the good aerodynamic properties thereof.

As is known, such panels are produced under elevated pressure and temperature. In this procedure the fibre-reinforced bonding layers are activated in order to obtain the desired bonding. The steps have to be supported by an auxiliary tool, such that the desired excess pressure can be guaranteed at the location of the edges as well. The auxiliary tool used is frequently made of steel. Consequently it has different mechanical properties to the laminate produced. In particular, the stiffness of the auxiliary tool is greater than that of the laminate. Moreover, it must be borne in mind that the laminate is compressed during production. Not only are the layers pressed flat to some extent as a result, but some of the fluid resin is also squeezed out of the pack during this operation. The auxiliary tool therefore has to have a thickness that is equal to that of the pack of layers in the compressed state, which will also be the thickness of the laminate in the finished state. As a result, the finished product will have the correct tolerances.

BRIEF SUMMARY OF THE INVENTION

In this context the conventional steel auxiliary tools are found to be less suitable for meeting the requirements. A specially produced auxiliary tool that has the correct thickness has to be produced for each laminate. The aim of the invention is, therefore, to provide a method for the production of a laminate that does not have these disadvantages. Said aim is achieved by means of a method for the production of a laminate consisting of metal layers as well as at least one fibre-reinforced bonding layer that is located between the metal layers, which laminate has at least one region that has a smaller number of layers than the remainder of the laminate, comprising the following steps:

forming a stack cons of metal layers and at least one fibre layer impregnated with a binder, which stack has a first series of successive layers with a different surface size to a second series of successive layers, such that one of the series of layers protrudes with respect to the other series of layers, placing an auxiliary tool at the protruding portion of the protruding series of layers alongside the other series of layers, which auxiliary tool has a make-up that is the same as that of said other series of layers.

activating the fibre-reinforced bonding layers under elevated pressure and temperature with the formation of the laminate.

Various advantages are obtained by using an auxiliary tool that has the same make-up as the laminate. First of all, the mechanical properties of such an auxiliary tool are better matched to those of the laminate. Consequently, even under pressure, the behaviour of the auxiliary tool better matches that of the laminate produced. For instance, the stiffness of the compressed laminate is much closer to that of the auxiliary tool according to the invention than that of a steel auxiliary tool. In addition, the coefficient of expansion of the compressed laminate is likewise close to that of the auxiliary tool. As a result, more uniform application of pressure to the entire laminate can be ensured, which is beneficial for the uniformity and high grade dimensioning (tolerance) of the panel produced therefrom.

The method according to the invention can be implemented in various ways. According to a first possibility, a pre-produced auxiliary tool is used. Such a pre-produced tool is produced under the same pressure and temperature as the laminate to be produced using this tool. This means that the thickness of the auxiliary tool will be an excellent match with the final thickness of the laminate to be produced using said tool.

According to a second possibility, the method according to the invention comprises:

placing a series of auxiliary layers on the protruding portion of the series of layers that produce, which series of auxiliary layers have a make-up that is the same as the make-up of the other series of layers, activating the fibre-reinforced bonding layers of the series of auxiliary layers under elevated pressure and temperature, and forming an auxiliary tool from the series of auxiliary layers at the same time as forming the laminate.

With such a state of affairs a completely uniform method of production for the laminate and the auxiliary tool is ensured. This is beneficial for the quality of the laminate. The laminate and the auxiliary tool can have any shape, for example with a single or double curvature. The same applies for the associated pressing tool.

The invention also relates to an auxiliary tool for use with the method described above for the production of a laminate consisting of metal layers and at least one fibre-reinforced bonding layer that is between the metal layers, which laminate has a first series of successive layers that are indented with respect to a second series of layers, with the formation of at least one region with a smaller number of layers than the remainder of the laminate, which auxiliary tool comprises a series of successive auxiliary layers that is the same as the indented series of layers.

BRIEF DESCRIPTION OF THE SEVERAL VIEWS OF THE DRAWINGS

The invention will be explained in more detail below with reference to the illustrative embodiments shown in the figures.

FIG. 1 shows a first variant of the method according to the invention.

FIG. 2 shows a second variant of the method.

DETAILED DESCRIPTION OF THE INVENTION

Figure 3:
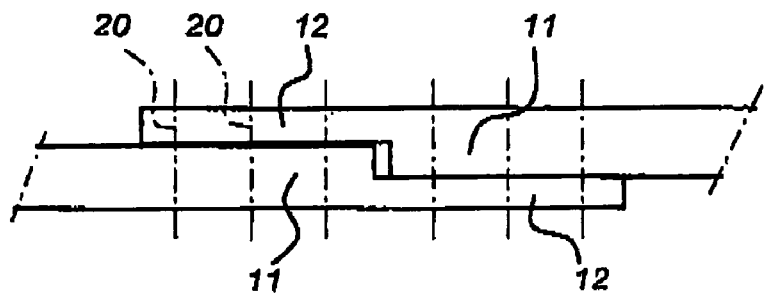
FIGS. 3–7 show possible assemblies of the laminate according to the invention

When producing a laminate, metal layers 1–4 alternating with fibre layers 5–7 impregnated with binder (prepreg) are stacked on top of one another in a forming mould, which is not shown in more detail, to give a stack 8. In the example shown the layers 5–7 each consist of two stacked impregnated fibre layers. It is possible to incorporate one or more impregnated fibre layers between two metal layers, as desired. This stack has a region 9 with a lower number of layers than the remainder of the laminate, as a result of which a step 10 is produced.

This step is obtained because the series 11 consisting of the layers 1, 2, 5 and 6 has a different surface dimension to the series 12 consisting of the layers 3, 4 and 7.

When combining the layers 1–7 to give a whole, to produce a finished laminate, the whole is subjected to an elevated pressure and temperature. As a supplementary feature, the pressure can be regularly distributed by the press tool 13 during this operation. The pressing tool 13 can be produced from laminate if a flat, single-curved or double-curved laminate is involved. The pressing tool 13 can be produced from metal strips if a flat or single-curved laminate is involved.

With the aim of nevertheless achieving adequate application of pressure even in the protruding region 19 that has a smaller number of layers, the auxiliary tool indicated in its entirety by 14 is used. This auxiliary tool consists of layers 1', 2', 5' and 6' identical to the first series 11. However, the auxiliary tool 14 is reversed, so that the fibre layer 6 impregnated with binder does not adhere to the surface 15 of the metal layer 3 during heating and application of pressure. There is a layer 16 of release material between the fibre layer 6 impregnated with binder and the mould.

The advantage of the use of an auxiliary tool 14 with the same makeup as the first series 11 is that uniform application of pressure that is equal to the pressure applied in the complete laminate is nevertheless obtained even in the protruding region 19. With this arrangement the mechanical properties of the auxiliary tool 14 are the same as those of the stack 11, so that as a result it is also not possible for any differences to arise.

With the method according to the invention, the auxiliary tool 14 can be made up together with the laminate. That is to say, at the start of the production process the layers 1', 2', 5' and 6' of the at tool 14 do not yet have to be attached to one another. On application of pressure and heating, formation of the auxiliary tool 14 then additionally takes place automatically, assuming that this whole is covered by parts of the laminate.

However, an auxiliary tool 14 produced in this way can also be used in the finished state when forming the laminate. It is true that the auxiliary tool 14 is then somewhat thinner, because it has already been compressed and cured, but the thickness thereof is then correctly matched to the height of the step 10 into laminate produced.

As shown in FIG. 2, the pressing tool 13 can also be applied to the auxiliary tool 14 and the complete stack 8, the bottom layer of the pressing tool 13 then being separated from the layer 6' of the auxiliary tool 14 and from the layer 1 of the stack 8 by a layer 16 of release material.

Two possible assemblies of the laminate as discussed above are shown in FIGS. 3 and 4. In FIG. 3 the series of protruding layers of both laminates lies over the other series 11. The laminates are attached to one another by means of fixing means that are inserted through holes, the axes of which are indicated diagrammatically by 20.

Figure 4:
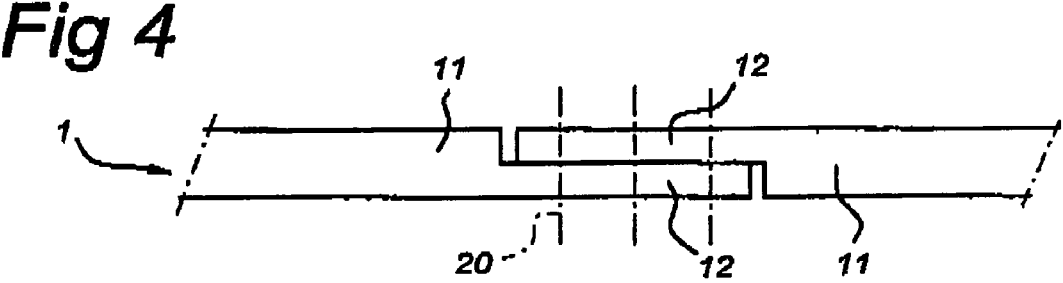

In the variant in FIG. 4 the series with protruding layers 12 are attached to one another.

Figure 5:
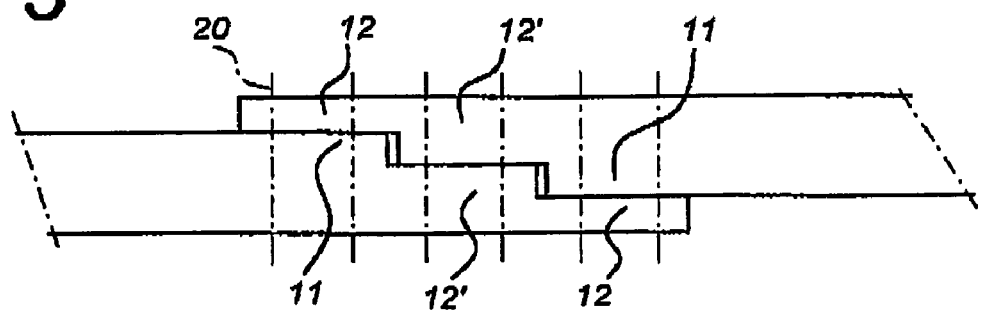

In the variant in FIG. 5 three different series 12, 12' and 11 are provided in each laminate. The protruding series 12 of the one laminate lies over the series 11 of the other laminate protrudes least far, etc.

Figure 6:
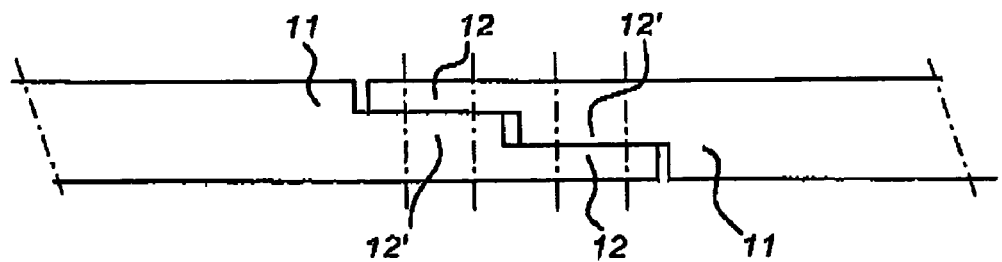

In the variant in FIG. 6, the series 12 that protrudes the furthest is opposite the series 11 of the other laminate, so that completely flat surfaces are obtained.

Figure 7:
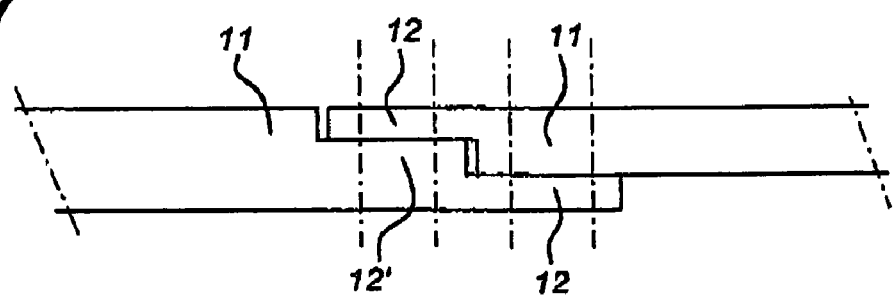

In the variant in FIG. 7 a laminate with two series 12, 11 is attached to a laminate with three series 11, 12, 12' so that only one side is flat.

What is claimed is:

1. Method for the production of a laminate comprising metal layers and at least one fibre-reinforced bonding layer (5–7) that is located between the metal layers (1–4), which laminate has at least one region (9) that has a smaller number (3,4,7) of layers than the remainder of the laminate, comprising the following steps:

forming a stack (8) comprising metal layers (1–4) and at least one fibre layer (5–7) impregnated with a binder, which stack (8) has a first series (11) of successive layers (1,2,5,6) with a different surface size than a second series (12) of successive layers (3,4,7), such that one (12) of the series of layers protrudes with respect to the other series (11) of layers, placing an auxiliary tool (14) at the protruding portion (19) of the protruding series (12) of layers alongside the other series (11) of layers, which auxiliary tool (14) has a make-up that is the same as that of said other series (11) of layers such that the auxiliary tool is made from the same material as and includes the same number of metal and fibre-reinforced layers as the other series (11) of layers, activating the at least one fibre-reinforced bonding layer (5,6,7) under elevated pressure and temperature with the formation of the laminate, and removing said auxiliary tool after the laminate is formed.

2. Method according to claim 1, comprising using a pre-produced auxiliary tool (14).

3. Method according to claim 1, comprising:

placing a series of auxiliary layers (1', 2', 5', 6') on the protruding portion of the series (12) of layers that protrude alongside the other series (11) of layers, which series of auxiliary layers (1', 2', 5', 6') have a makeup that is the same as the mae-up of the other series (11) of layers, activating the at least one fibre-reinforced bonding layer (5', 6') of the series of auxiliary layers under elevated pressure and temperature, and forming an auxiliary tool (14) from the series of auxiliary layers (1', 2', 5', 6') at the same time as forming the laminate.

4. Method according to claim 1, wherein the laminate and the auxiliary tool (14) have at least one curvature.

5. Method according to claim 1, comprising placing the stack of layers (8) in a forming mould and applying a release material (16) between the auxiliary tool (14) and the forming mould.

6. Method according to claim 1, comprising forming a protruding series (12) of layers in which the layer (3) that faces the auxiliary tool (14) is a metal layer and placing an auxiliary tool in the reversed position compared with the make-up of the other series of layers (11).

7. Method according to claim 1, wherein a pressing tool (13) is used for applying pressure o the series (11, 12) of layers and the auxiliary tool (14).

8. Method according to claim 7, wherein the laminate and the pressing tool have at least one curvature.

9. Method according to claim 7, comprising applying a release material (16) between the pressing tool (13) and a layer (1) of the stack (8) facing said pressing tool.

10. Method according to claim 7, comprising applying a release material (16) between the pressing tool (13) and the auxiliary tool (14).

* * * * *